United States Patent [19]
Baril et al.

[11] Patent Number: 5,683,831
[45] Date of Patent: Nov. 4, 1997

[54] COMPACT BATTERY PACK FOR A HELMET MOUNTED NIGHT VISION DEVICE

[75] Inventors: Albert Morton Baril, Roanoke; Roy Herbert Holmes, Salem; Mark Alan Bryant; Bradley Philippi, both of Roanoke, all of Va.

[73] Assignee: ITT Defense, Inc., McLean, Va.

[21] Appl. No.: 626,190

[22] Filed: Mar. 29, 1996

[51] Int. Cl.⁶ ........................................ H01M 2/10
[52] U.S. Cl. .................. 429/96; 429/97; 429/99; 429/100
[58] Field of Search ................ 429/96, 97, 98, 429/99, 100, 1

[56] References Cited

U.S. PATENT DOCUMENTS

| | | | |
|---|---|---|---|
| 3,999,110 | 12/1976 | Ramstrom et al. | 320/2 |
| 4,129,688 | 12/1978 | Fischer et al. | 429/97 |
| 4,371,594 | 2/1983 | Ohara et al. | 429/97 |
| 4,470,263 | 9/1984 | Lehovec et al. | 62/3 |
| 4,634,936 | 1/1987 | Gentry et al. | 315/307 |
| 5,121,045 | 6/1992 | Caserta et al. | 320/13 |
| 5,413,499 | 5/1995 | Wright, Jr. et al. | 439/500 |

*Primary Examiner*—Prince Willis, Jr.
*Assistant Examiner*—Jonathan S. Krueger
*Attorney, Agent, or Firm*—Plevy & Associates

[57] ABSTRACT

A battery pack device which can be removably attached to a SPH-4 helmet and used to power an ANVIS night vision goggle device which is mounted on the helmet. The battery pack device includes a battery pack assembly with a bent-shaped housing that enables the battery pack assembly to conform to the shape of the helmet. The housing of the battery pack assembly is adapted to hold only two replaceable AA battery sets to minimize the weight of the battery pack device. The battery pack assembly also includes electrical circuitry for selecting one of the two battery sets to power the night vision device. A support assembly adapted to be permanently fastened to the helmet is provided for removably attaching the battery pack assembly to the rear of the helmet.

17 Claims, 6 Drawing Sheets

COMPACT BATTERY PACK FOR A HELMET MOUNTED NIGHT VISION DEVICE

FIELD OF THE INVENTION

The present invention relates generally to night vision devices and more particularly to an improved battery pack for a helmet mounted night vision device.

BACKGROUND OF THE INVENTION

Helmet mounted night vision devices are used by various military personnel such as aircraft pilots to enhance their night-time vision. Such devices typically take the form of night vision goggles which employ light intensifier devices which operate to multiply the incident light received to produce a display that is bright enough for presentation to the eyes of a viewer. Thus, in the case of the aircraft pilot, the goggles enable the pilot to sight objects that would otherwise not be visible.

Figure 1:
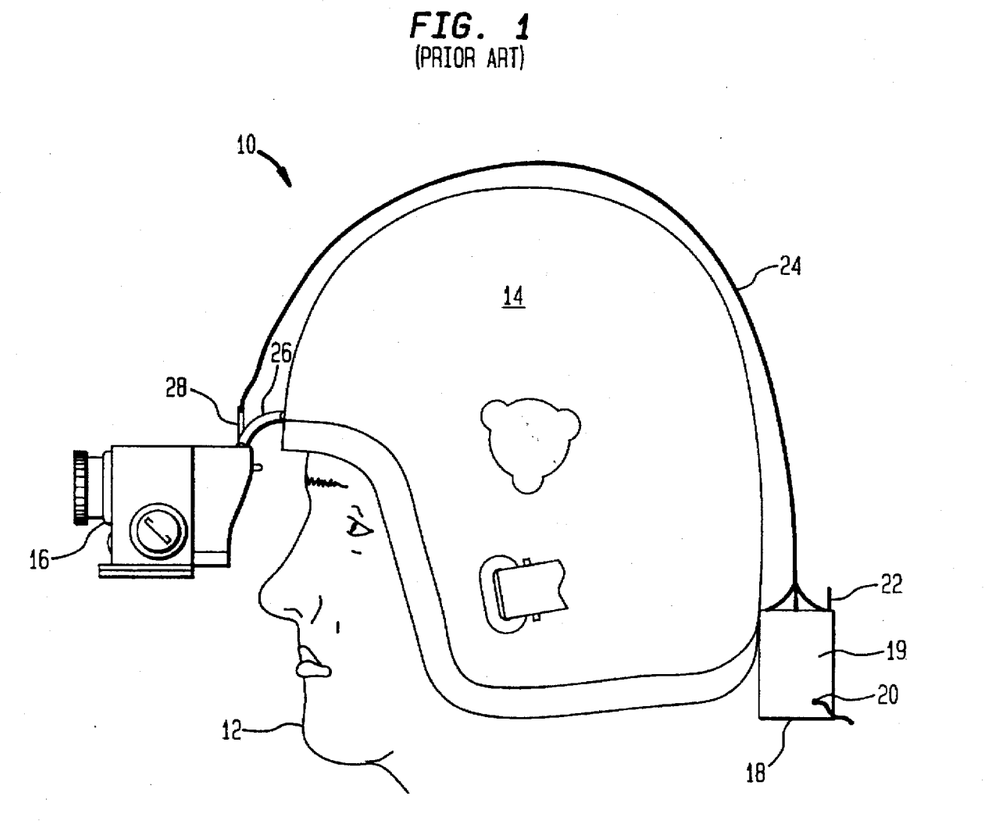
FIG. 1 is a schematic diagram of a typical night vision goggle/helmet system powered by a prior art battery pack.

A typical night vision goggle/helmet system 10 is shown in FIG. 1. An ANVIS night vision goggle device 16 is attached to the front portion of a SPH-4 helmet 14 where the goggles 16 can be easily used by the operator 12. A battery pack 18 is attached to the rear portion of the helmet 12 by a 2"×3" hook and loop faster pad (not shown) such as the type marketed under the trademark VELCRO. The battery pack 18 operates as a power supply for the night vision goggles 16. The electrical power supplied by the battery pack 18 is transmitted forward to the goggle assembly 16 from the battery pack 18 by a shielded cable 24 and an in-line connector 28 located on the visor guard 26.

Prior art battery packs for helmet mounted night vision devices such as the one described above, are designed to accept power from three different sources which include two separate battery types and 28 vdc aircraft power. In any case, the battery pack 18 shown in FIG. 1 provides a 3 vdc output via the shielded cable 24 and the in-line connector 28 to power the image intensifier tube or tubes in the night vision goggle device 16. The prior art battery pack 18 is configured to hold two sets of batteries while aircraft power enters through an external connector 20 on the side of the battery pack housing 19. The type of batteries which can be held within the battery pack include AA and BA-5567 batteries.

A triple pole, double throw switch 22 is provided on the battery pack housing 19 so that, when the night vision goggles 16 are operated from battery power, the user 12 can pick either the "right" or "left" battery (batteries) or can turn the goggles 16 off. When the goggles 16 are operated from aircraft power, the switch 22 then functions as an on or off switch for the goggles 16.

On problem associated with the prior art battery pack 18 of FIG. 1 is that they are relatively large and heavy in order to accommodate both battery types and the necessary electrical circuitry. As such, the battery pack 18 often interferes with adjacently located objects when the helmet 14 to which the battery pack 18 is attached, is worn in tight quarters. In particular, the battery pack 18 can be torn loose from the helmet 14 by hitting it sharply or by wedging it between cushions on the aircraft seat-back. When the battery pack 18 is torn loose, not only can the battery pack 18 become damaged therefore, resulting in the loss of the proper supply voltage but the cable 24 and in-line connector 28 can also be rendered useless.

Another problem associated with the prior art battery pack 18 is that it adds considerable weight to the helmet 14 and goggle 16 assembly. The heavy combined weight of the battery pack 18, helmet 14 and goggles 16 can strain the operator's 12 neck thereby substantially reducing the operator's 12 comfort and effectiveness.

It is, therefore, an object of the present invention to provide an improved battery pack for helmet mounted night vision devices which provides substantial weight and size savings over prior art battery packs.

SUMMARY OF THE INVENTION

A battery pack device for use with a helmet having a night vision device mounted thereto. The battery pack device comprises a battery pack assembly having a bent-shaped housing which enables the battery pack assembly to conform to the helmet. Also provided is a support assembly for removably attaching the battery pack assembly to the helmet.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

Although the battery pack of the present invention can be used in many different applications where battery packs are required, the present invention is especially suited for use with a SPH-4 helmet which mounts ANVIS night vision goggles. Accordingly the battery pack of the present invention will be described in conjunction with such a helmet arrangement.

The battery pack of the present invention substantially eliminates the difficulties found in existing battery pack designs for helmet mounted night vision devices. This is accomplished in the present invention by limiting the input power possibilities of the battery pack which results in a substantial weight and size savings, and by form fitting the housing of the battery pack to the helmet configuration as will be later explained.

As mentioned above, the battery pack of the present invention provides a substantial weight size savings by limiting the input power possibilities. This is extremely desirable as it has been found that a vast majority of the current ANVIS goggle users prefer using conventional AA batteries over military style BA-5567 batteries. Additionally, users have not expressed a preference for using aircraft power as a source of goggle power. Accordingly, the battery pack of the present invention uses AA batteries exclusively.

Figure 2A:
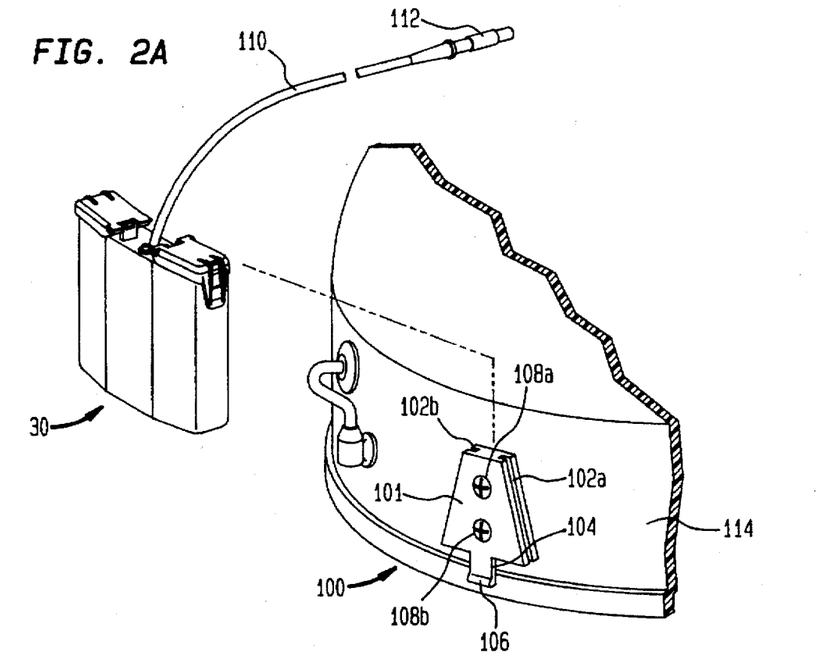
FIG. 2A is an exploded view of the battery pack of the present invention showing the battery pack and support assemblies.
Figure 2B:
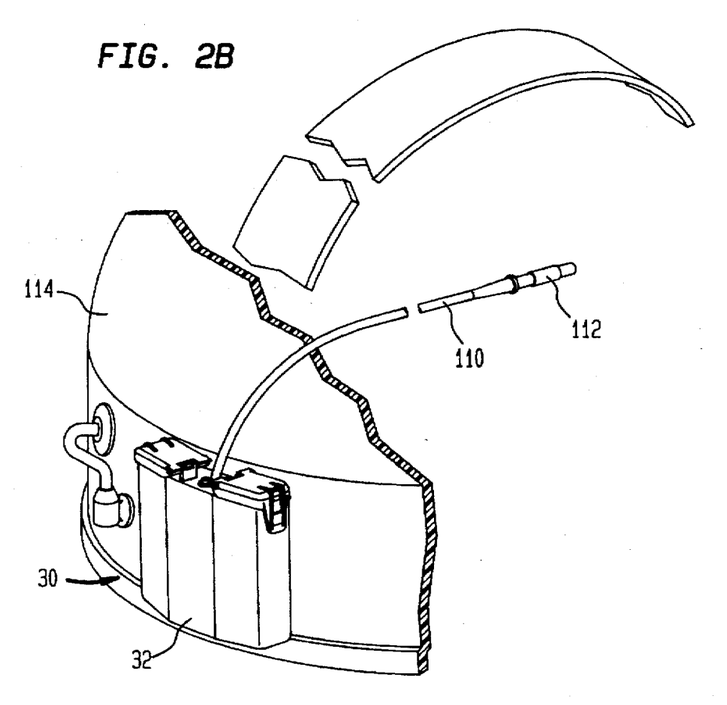
FIG. 2B shows the battery pack assembly of the present invention attached to the helmet via the support assembly shown in FIG. 2A.

Referring to FIG. 2A, the battery pack of the present invention generally includes a battery pack assembly 30 and a support assembly 100. The support assembly 100 enables the battery pack assembly 30 to be coupled to the rear portion of a SPH-4 helmet 114 as shown in FIG. 2B. A shielded cable 110 terminating with an in-line connector 112 couples the battery pack assembly 30 to an ANVIS night vision goggle device (not shown) or like device and operates to transmit electrical power supplied by the battery pack assembly 30 forward to the goggle device.

Figure 2C:
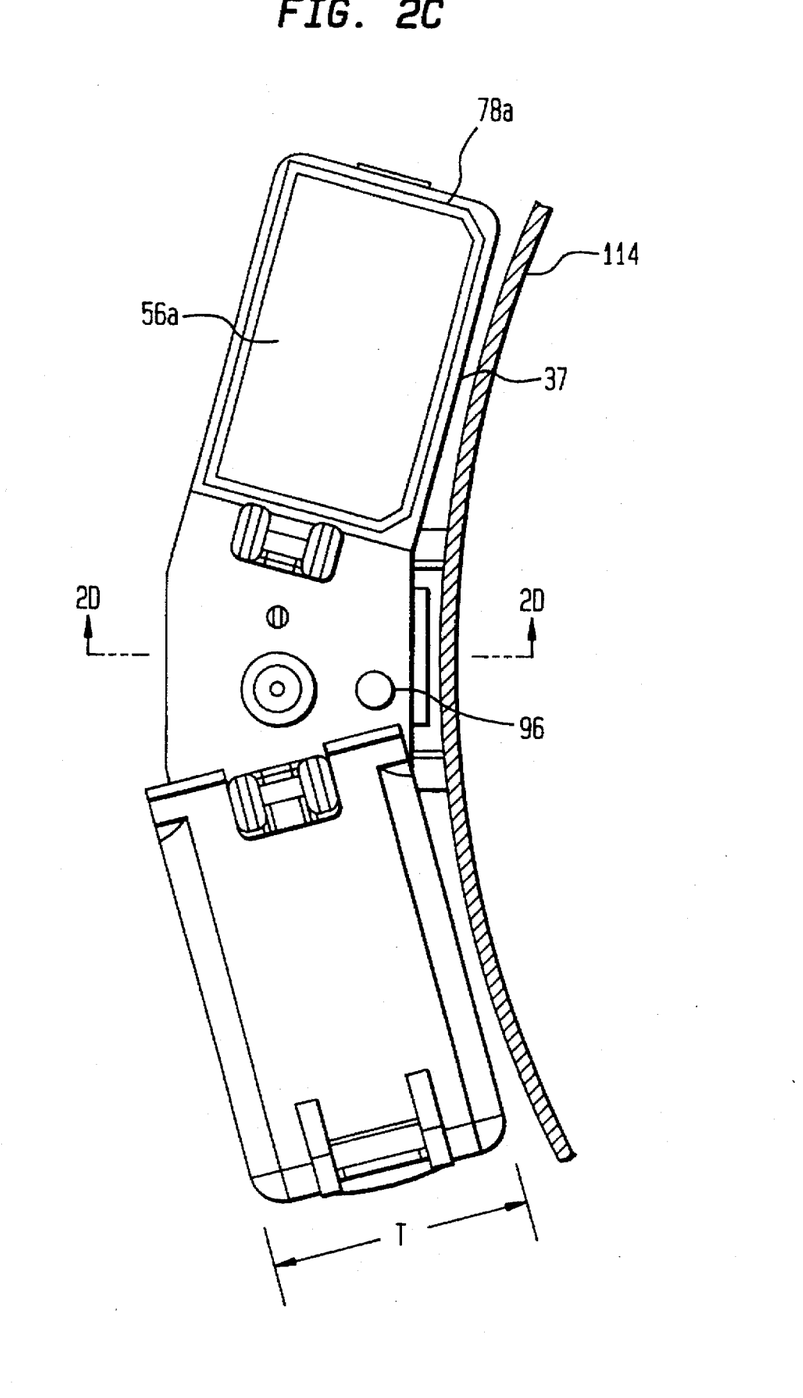
FIG. 2C is a top plan view of the battery pack of the present invention attached to the helmet (shown in cross-section)

Referring to FIG. 2C, the battery pack assembly 30 includes a bent-shaped housing 32 preferably molded from plastic which allows the battery pack assembly 30 to conform to the curvature of the helmet 114. The housing 32 has a preferred thickness T of approximately 1 inch which is about half the thickness of the existing battery pack housing of FIG. 1. The bent-shaped of the housing 32 in combination with its reduced thickness substantially decreases the possibility of the battery pack assembly 30 being wedged between the seat cushions of the aircraft or being struck sharply enough to dislodged it from the helmet 114.

Referring again to FIG. 2A, the support assembly 100 includes a triangular shaped mounting pad 101 preferably molded from plastic which is fastened to the helmet 114 by a pair of screw type fasteners 108a, 108b. The support assembly 100 locks the battery pack assembly 30 to the helmet 114 and thus, takes the place of the VELCRO mounting pad of the prior art battery pack of FIG. 1. The battery pack assembly 30 slidably attaches to the mounting pad 101 via a tongue and groove structure which includes a groove 102a, 102b in each respective side surface of the mounting pad 101 and mounting rails 33a, 33b defined on the helmet facing side 37 of the housing 32 as shown in FIG. 3.

When the battery pack assembly 30 is installed on the helmet 114, the mounting rails 33a, 33b molded into, the helmet facing side 37 of the housing 32, engage and slide into the grooves of the mounting pad 101. A spring loaded latch arrangement which includes members on both the housing 32 and the mounting pad 101, lock the battery pack assembly 30 to the support assembly 100.

The spring loaded latch arrangement includes an elongated member 104 on the mounting pad that extends downwardly therefrom. The elongated member 104 includes a locking projection 106 as shown in FIG. 2A. The latch arrangement also includes a resilient latch member 40 on the housing 32 as shown in FIG. 3. The latch member 40 includes an aperture 42 for receiving the locking projection 106 of the elongated member 104.

Figures 2D, 3:
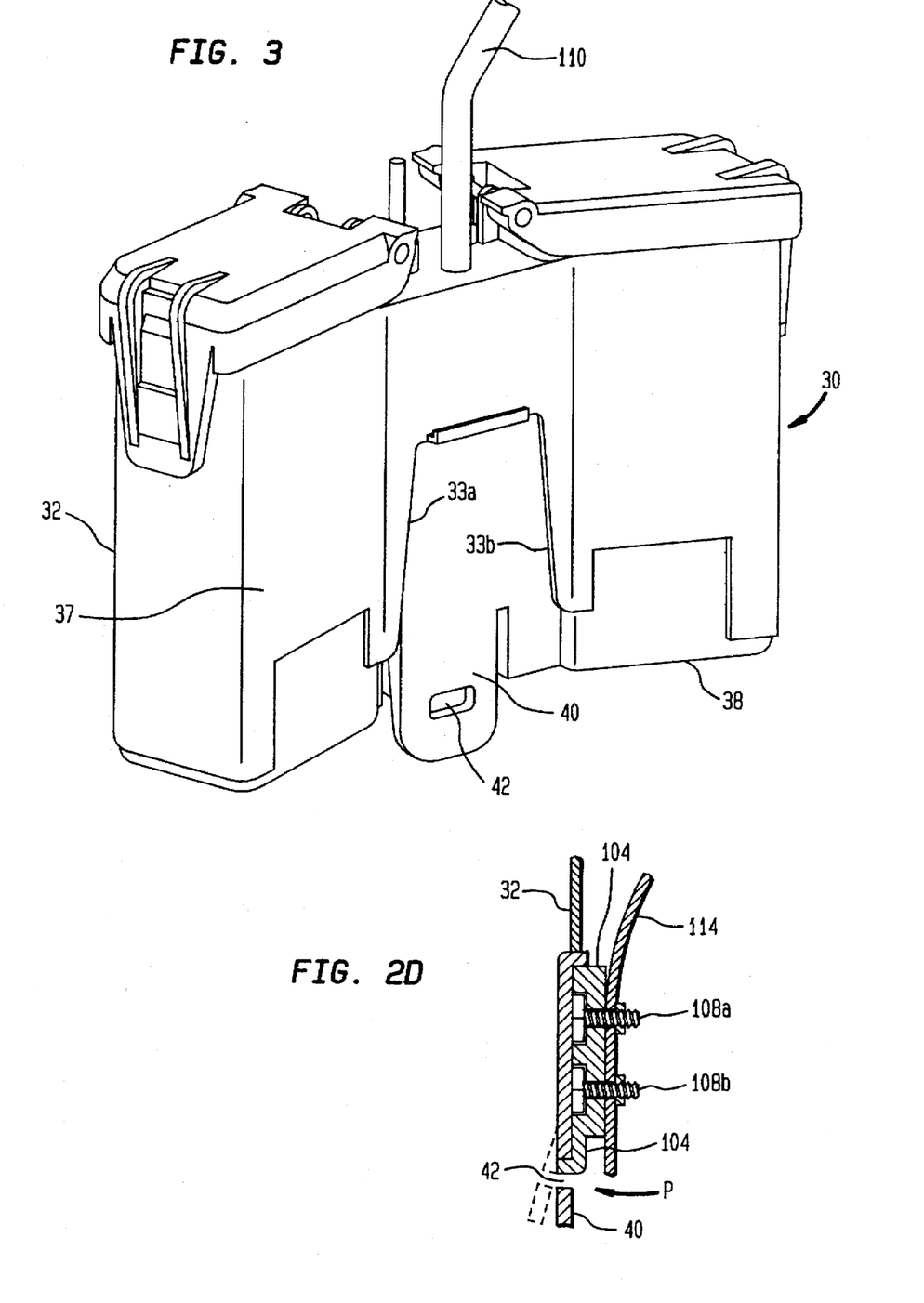
FIG. 2D is a cross-sectional view through line 2D—2D of FIG. 2C.
FIG. 3 is a perspective view of the battery pack assembly shown from the helmet facing side thereof.

FIG. 2D illustrates how the spring loaded latch arrangement locks the battery pack assembly 30 to the support assembly 100. As can be seen, when the battery pack assembly 30 is attached to the support assembly, the locking projection 106 on the elongated member 104 slides along the latch member 40 until it engages and locks within the aperture 42. The latch is unlocked by applying pressure P to the resilient latch member 40 to bend it away from the elongated member 104 thereby disengaging the projection 106 from the aperture 42 of the latch member 40. Once the latch is disengaged, the battery pack assembly 30 can be slidably removed from the support assembly 100.

Figure 4A:
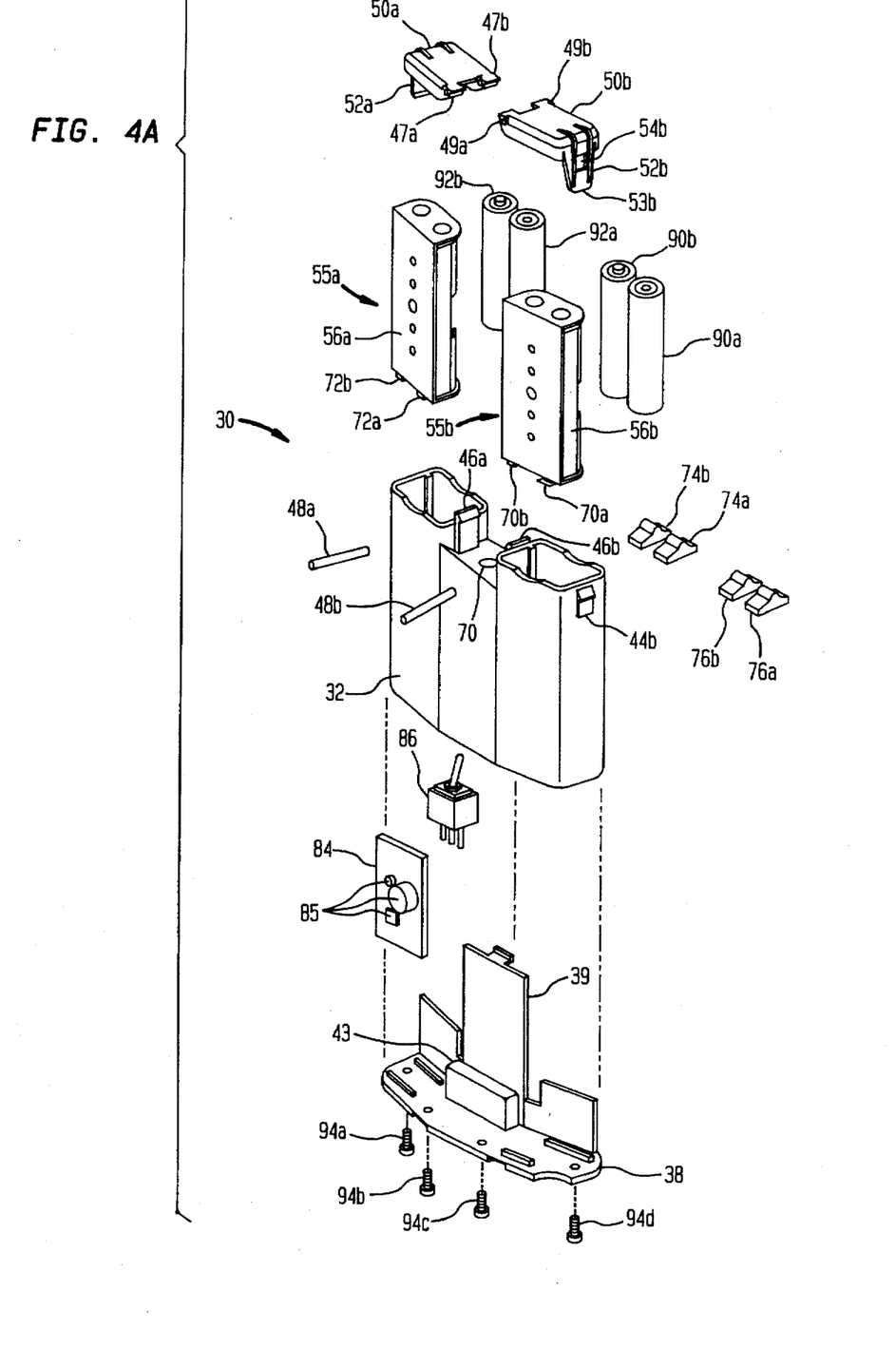
FIG. 4A is an exploded perspective view of the battery pack assembly.
Figure 4B:
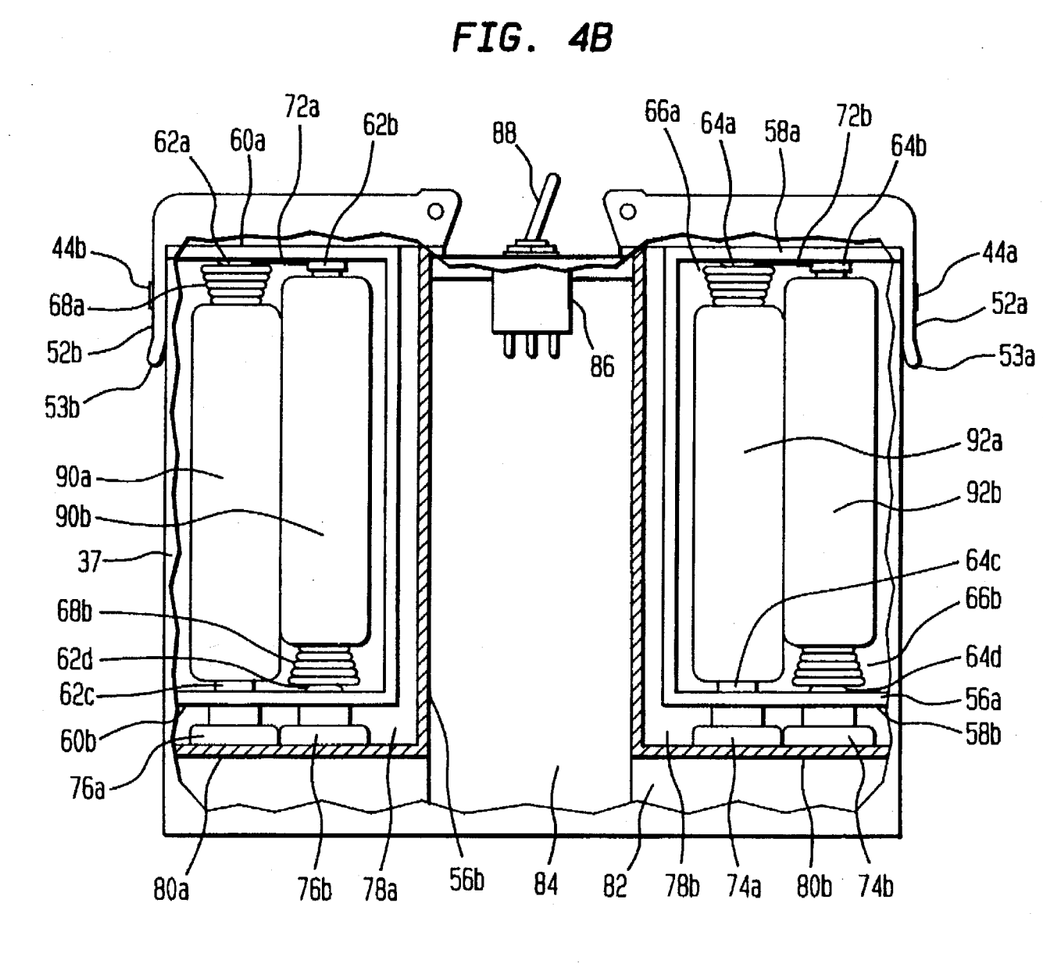
FIG. 4B is a broken-out front sectional view of the battery pack assembly.

Referring to FIGS. 4A and 4B, the housing 32 defines a main interior compartment 82 which includes a pair of separately defined battery set compartments 78a, 78b. The battery set compartments 78a, 78b are each sized to receive a respective removable AA battery set 55a, 55b. Each removable AA battery set 55a, 55b comprises a respective battery carrier 56a, 56b and replaceable pairs of conventional AA batteries 90a, 90b and 92a, 92b. Disposed at the first ends 58a, 60a and second ends 58b, 60b of the battery carriers 56a, 56b are electrical contacts 62a–d and 64a–d for electrically coupling each pair of AA batteries contained in a given one of the battery sets, together in series. This is accomplished by running a jumper wire 72a, 72b or other like means between the contacts 62a, 62b and 64a, 64b located at first ends 58a, 60a of the battery carriers. Coil springs 66a, 66b, 68a, 68b or other like conductive biasing means are coupled to respective contacts 64a, 64d, 62a, 62d. The coil springs operate to bias each battery against its respective electrical contacts. The contacts 62c, 62d, 64c, 64d extend through the second ends 58b, 60b of the carriers extend and engage corresponding spring type power contacts 74a, 74b, 76a, 76b disposed on floors 80a, 80b of the battery set compartments. The power contacts 74a, 74b, 76a, 76b couple the battery sets to discrete electrical components 85 mounted on a printed circuit board 84 retained within the central portion of the main interior compartment 82 of the housing 32. A toggle switch 86 is also retained within the central portion of the main interior compartment 82. The toggle switch 86 and the power contacts 74a, 74b, 76a, 76b are electrically coupled to the printed circuit board 84 using wires (not shown) or other like means. The shielded cable 110 enters the housing 32 through an aperture 96 (FIG. 2C) and is electrically coupled to the printed circuit board 84 in order to transmit the electrical power supplied by the battery sets 55a, 55b to the night vision goggles.

The toggle switch 86 and the circuitry provided by the discrete electrical components 85 allow a user to select either one or none of the battery sets 55a, 55b. The toggle switch 86 includes a switch handle 88 which protrudes through a second aperture 70 (FIG. 4A) provided in the top of the housing 32. The battery sets 55a, 55b are individually selected by moving the switch handle 88 of the toggle switch 86 between three positions. Two of the three switch positions (left and right) are for selecting one or the other battery sets. Moving the switch handle 88 to the remaining center switch position electrically disconnects both battery sets and thus operates to turn the night vision goggles off. The electrical circuitry is also designed to enable the detection of a reduced voltage from one of the battery sets 55a, 55b. In this instance, a signal voltage is sent through the shielded cable 110, to a small LED (not shown) which is positioned just inside the user's field of view. When the LED flashes, this indicates that the batteries of the selected battery set powering the night vision goggles are in need of replacement. If this occurs, the user can then switch over to the other battery set to power the goggles. While the other battery set is powering the goggles, the user can now replace the weaker set of batteries. Such electrical circuitry for switching between a pair of battery sets and indicating reduced voltage is well known in the art as exemplified by U.S. Pat. No. 5,121,045 entitled EMI PROOF BATTERY PACK FOR NIGHT VISION GOGGLES, issued to Caserta et al. on Jun. 9, 1992 and assigned to ITT Corporation, the assignee herein, the disclosure of which is incorporated herein by reference.

As can be seen by referring again to FIG. 2C, the battery set compartments (only battery set compartment 78a is shown) of the housing 32 are each molded such that the battery compartment is keyed to the asymmetrical profile of the battery set carrier to maintain polarity between the battery set and the power contacts. Thus, the battery set can only be installed in the battery compartment in two possible positions instead four possible positions which substantially reduces battery installation errors.

Referring still to FIG. 4A and in addition to FIG. 4B, the housing 32 of the battery pack assembly 30 further includes a pair of pivoting battery set compartment access doors 50a, 50b which are each hinged to the housing 32 adjacent to the opening of each battery set compartment 78a, 78b via hinge pins 48a, 48b which pass through hinge pin receptacles 46a, 46b on the housing 32 and hinge pin receptacles 47a, 47b, 49a, 49b on the access doors. The battery set compartment access doors hold the battery sets in position inside their respective battery set compartment and in contact with their associated power contacts. The access doors each include a unitarily molded latch 52a, 52b which elastically deforms to slide over a respective stop member 44a, 44b molded into each side of the housing 32 to latch the access doors shut. The lower end of each latch 52a, 52b curves outward slightly from the housing 32 so that the user, even while wearing gloves, can open the access doors and replace the battery sets. This is accomplished by grasping the latch at the lower end thereof and bending it away from the side of housing so that the latch can slide over the stop member to open the access door.

The housing also includes a removable base 38 which operates as a closure for sealing the interior of the housing. The interior surface of the housing 32 includes a pair slots 43 for mounting the printed circuit board 84. An upwardly projecting portion 39 of the base 38 defines the latch member 40 of the spring loaded latch. As can be seen, the base is fastened to the second end of the housing by screw type fasteners 94a–d.

The battery pack of the present invention, when installed with batteries and locked onto the helmet, enables a user to operate the night vision goggles by simply selecting either of the battery sets by moving the switch handle left or right, or turn the goggles off by moving the switch handle to the center position.

It should be understood that the embodiment described herein is merely exemplary and that a person skilled in the art may make many variations and modifications to the embodiment utilizing functionally equivalent elements to those described herein. Any and all such variations or modifications as well as others which may become apparent to those skilled in the art, are intended to be included within the scope of the invention as defined by the appended claims.

What is claimed is:

1. A battery pack device for use with a helmet having a night vision device mounted thereto, said battery pack device comprising:

a battery pack assembly having a bent-shaped housing which enables said battery pack assembly to conform to the helmet; and a support assembly for removably attaching said battery pack assembly to said helmet;

wherein said housing includes a tongue member and said support assembly includes a groove which slidably receives said tongue member of said housing for removably attaching said battery pack assembly to said support assembly.

2. The battery pack device according to claim 1, wherein said housing of said battery pack assembly includes two replaceable battery sets for powering the night vision device.

3. The battery pack device according to claim 2, wherein said battery pack assembly includes electrical circuitry means for selecting one of said battery sets to power the night vision device and for turning off the night vision device.

4. The battery pack device according to claim 3, wherein said electrical circuitry means includes means for detecting a reduced voltage from one of said battery sets.

5. The battery pack device according to claim 2, wherein said housing includes two compartments, each one of said compartments having means for ensuring that an associated one of said battery sets can only be received in a predetermined orientation to maintain proper battery polarity.

6. The battery pack device according to claim 5, wherein each of said compartments is accessible through a pivoting closure.

7. The battery pack device according to claim 6, wherein each of said closures includes latch means which are unitarily molded with said closure.

8. The battery pack device according to claim 2, wherein each of said battery sets includes AA batteries.

9. The battery pack device according to claim 1, wherein said battery pack assembly includes a shielded cable for electrically coupling said battery pack assembly to the night vision device.

10. The battery pack device according to claim 1, wherein said support assembly includes a rigid mounting surface.

11. The battery pack device according to claim 10, wherein said battery pack assembly and said support assembly each include latch means for locking said battery pack assembly to said support assembly.

12. A battery pack device which can be removably attached to a helmet, said battery pack device for powering a night vision goggle device which is mounted on the helmet, said battery pack device comprising:

a battery pack assembly having a bent-shaped housing which enables said battery pack assembly to conform to the helmet and a shielded cable for electrically coupling said battery pack assembly to the night vision device; and a support assembly adapted to be permanently fastened to the helmet for removably attaching said battery pack assembly to said helmet;

wherein said housing includes a tongue member and said support assembly includes a groove which slidably receives said tongue member of said housing for removably attaching said battery pack assembly to said support assembly.

13. The battery pack device according to claim 12, wherein said housing of said battery pack assembly includes two replaceable AA battery sets for powering the night vision device.

14. The battery pack device according to claim 13, wherein said battery pack assembly includes electrical circuitry means for selecting one of said battery sets to power the night vision device, for turning off the night vision device, and for detecting a reduced voltage from one or the other of said battery sets.

15. The battery pack device according to claim 13, wherein said housing includes means for installing each of said battery sets in said housing in only the proper orientation to achieve proper battery polarity and electrical coupling with electrical circuitry means contained within said housing.

16. The battery pack device according to claim 12, wherein said housing includes at least one pivoting closure with a unitarily molded latch.

17. A battery pack device for use with a helmet having a night vision device mounted thereto, said battery pack device comprising:

a battery pack assembly including:
- at least one replaceable battery set having an asymmetrically-shaped battery carrier for holding at least one battery;
- a bent-shaped housing which enables said battery pack assembly to conform to the helmet, said housing having a battery set compartment which is asymmetrically shaped to correspond to said asymmetrically-shaped battery carrier to insure that said battery carrier is inserted into said battery set compartment in a proper orientation; and a support assembly for removably attaching said battery pack assembly to said helmet.

* * * * *